United States Patent [19]
Fletcher et al.

[11] 3,771,959
[45] Nov. 13, 1973

[54] CATALYST CARTRIDGE FOR CARBON DIOXIDE REDUCTION UNIT

[76] Inventors: James C. Fletcher, Administrator of the National Aeronautics and Space Administration with respect to an invention of; Roy F. Holmes, 4240 Morrell St., San Diego, Calif. 92109

[22] Filed: Oct. 21, 1971

[21] Appl. No.: 191,301

[52] U.S. Cl. ............ 23/288 J, 23/288 F, 23/252 R, 23/281, 423/231, 128/191 R, 55/510, 55/518
[51] Int. Cl............................ B01j 9/04, B01d 53/34
[58] Field of Search........................ 23/288 F, 288 J, 23/252 R, 281; 423/217, 218, 220, 230, 231; 128/191 R; 55/510, 518

[56] References Cited
UNITED STATES PATENTS 3,421,826  1/1969  Tope et al. ....................... 23/288 F X
3,499,269  3/1970  Bois.............................. 23/288 F UX
3,497,312  2/1970  Zeff et al....................... 23/280 F X Primary Examiner—James H. Tayman, Jr.
Attorney—John R. Manning et al.

[57] ABSTRACT

The catalyst cartridge has an inner cylindrical perforated wall and an outer cylindrical perforated wall concentric with the inner wall and spaced radially therefrom. One end of the cartridge is closed by a circular base. The other end of the cylindrical cartridge is closed by a circular covering having a central aperture therein for admitting a mixture of hydrogen and carbon dioxide gas through a supply pipe having an electric heater therein. The outer surface of the inner wall and the inner surface of the outer wall, and the inner surfaces of the base and cover caps are covered with a batting of quartz wool which encloses within the space defined a catalyst material or iron in the form of uniformly packed steel wool.

6 Claims, 4 Drawing Figures

INVENTOR.
ROY F. HOLMES 3,771,959

CATALYST CARTRIDGE FOR CARBON DIOXIDE REDUCTION UNIT

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

Field of the Invention

This invention relates generally to life support systems of the type utilized in space vehicles. One of the functions of the life support system in brief is to remove the carbon dioxide produced by crew members from the spaceship or spacesuit atmosphere, and to reclaim oxygen from the carbon dioxide. One known method for accomplishing this utilizes the Bosch process which catalytically reacts hydrogen with carbon dioxide to produce water and solid carbon. The water is then electrolyzed to yield hydrogen for reuse in the Bosch reaction and oxygen for the crew. In previously employed systems utilizing the Bosch reaction, there have been a number of difficulties encountered.

The primary problem which has prevented the full realization of the Bosch reaction in life support systems has been the prevention of any reaction in parts of the system where carbon deposits cannot be tolerated. In continuous removal reactors, migration of the carbon resulting from the reaction has not been successfully controlled and in batch removal systems, its migration from reaction zone or formation outside the reaction zone has not been prevented.

It is an object of this invention to provide a replaceable catalyst cartridge for a life support system utilizing the Bosch reaction for the reduction of carbon dioxide whereby total carbon containment is achieved within the desired reaction zone. It is also an object of this invention to guarantee that the carbon dioxide reduction takes place in the reaction zone only and that the product carbon formed in the reaction zone is retained within the reaction zone and does not migrate elsewhere in the system carrying catalyst with it, thus preventing any carbon formation reaction taking place outside the reaction zone.

The Bosch catalytic reaction is carried out at temperatures generally in the range of 1,000° to 1,400°F and may be represented by the following overall chemical equation:

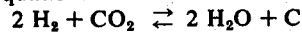

The intermediate reactions which take place include the following:

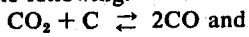

which combined yield the following overall representation: $xH_2 + yCO_2 \rightleftarrows aH_2O + bC + cCO + dCH_4$
wherein $x = 2y$, and $a, b, c,$ and $d$ are variable with time, temperature, pressure, and initial concentrations of the reactants.

SUMMARY OF THE INVENTION

This invention comprises a catalyst cartridge particularly for utilization in a carbon dioxide reducing apparatus in a life support system for space vehicles. The catalyst cartridge includes an inner perforated metal wall, an outer perforated wall spaced outwardly from the inner wall, a base plate closing one end of the cartridge, and a cover plate closing the other end of the cartridge. The cover plate has a central aperture therein through which a supply line having a heater therein feeds a gaseous reaction mixture comprising hydrogen and carbon dioxide at a temperature from about 1,000°F to about 1,400°F. The outer surfaces of the internal wall and the inner surfaces of the outer wall are lined with a ceramic fiber batting material of sufficient thickness to prevent carbon formed in the reaction from passing through it. The portion of the surfaces of the base and cover plates defined within the inner and outer walls are likewise lined with ceramic batting, thus forming a complete enclosure lined with such batting. Contained within the enclosure of the batting is an iron catalyst for the reaction. The heated reaction mixture passes outwardly through the inner perforated wall and ceramic batting and over the catalyst. The solid carbon product formed is retained within the enclosure containing the catalyst. The water vapor and unreacted carbon dioxide and any intermediate products pass through the perforations of the outer wall. No reaction takes place outside the area containing the catalyst and any migration of the catalyst bearing carbon is prevented.

BRIEF DESCRIPTION OF THE DRAWINGS

Referring to the drawings.

DESCRIPTION OF THE PREFERRED EMBODIMENTS

Figure 1:
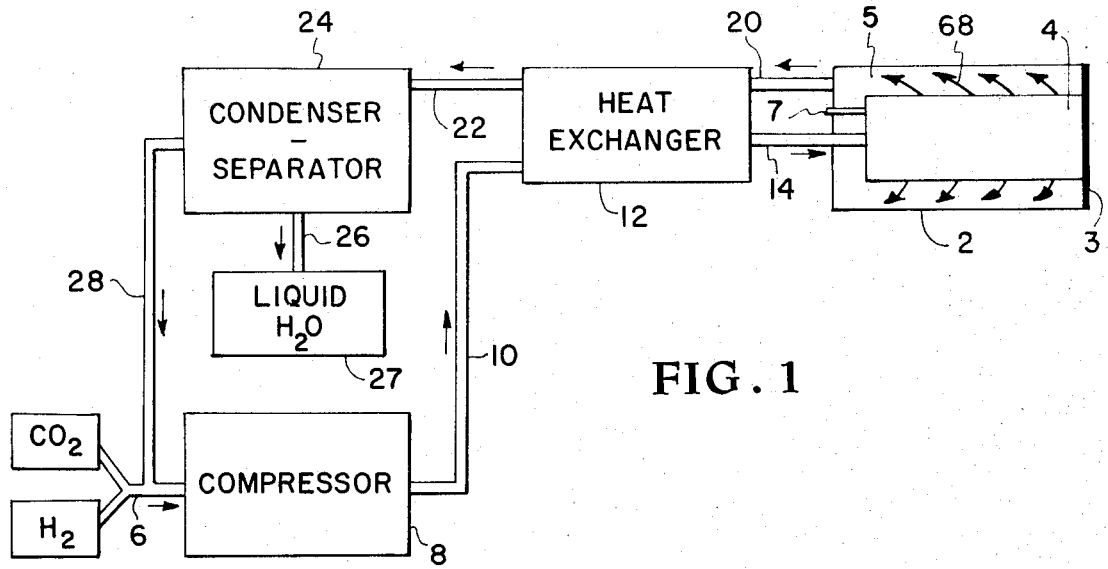
FIG. 1 is a schematic of a system utilizing the catalytic cartridge of this invention for the reduction of carbon dioxide by means of the Bosch reaction.
Figure 3:
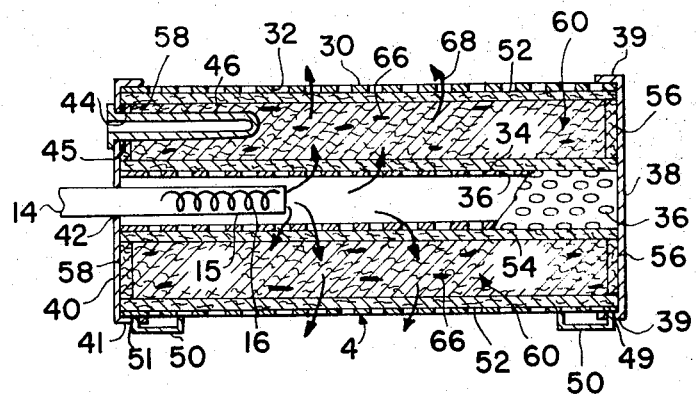
FIG. 3 is a side sectional view of the catalyst cartridge of this invention, taken along line 3—3 of FIG. 2.

A system for reducing carbon dioxide to carbon and water utilizing the Bosch reaction is shown in schematic form in FIG. 1 of the accompanying drawings. There is shown a reactor 2 within which the catalyst cartridge 4 of this invention is mounted on the base 3 of the reactor 2. A mixture of hydrogen and carbon dioxide is fed to the system through feed line 6 which leads to a compressor 8. The compressor pumps the gases through feed line 10 to heat exchanger 12 wherein the mixture is heated to approximately reaction temperature and then from the heat exchanger 12 passes through supply line 14 to the reactor 2. The line 14 has an electric heater 16 in the end 15 which passes through the cover 40 into the center of the catalyst cartridge 4, as shown in FIG. 3. As represented by the heavy arrows 68, a mixture of reacted and unreacted gases passes from the catalyst cartridge 4 into the outer portion 5 of the reactor 2, and thereafter out through line 20 to heat exhanger 12. The gases comprise a mixture of hydrogen, methane, carbon monoxide, carbon dioxide, and water vapor. From the heat exchanger 12 the gases pass through line 22 to the condensor-separator apparatus 24 which condenses the water vapor which then passes through line 26 to storage tank 27 and is thereafter treated electrolytically to yield hydrogen and oxygen. The oxygen is then resupplied to the crew members and the hydrogen returned for utilization in the carbon dioxide reduction process. The other gases from the reaction are recycled through line 28 and mixed together with the hydrogen and carbon dioxide gas in line 6. A reactor thermocouple well 7 extends to the outside of the reactor 2 from the cartridge 4.

Figure 2:
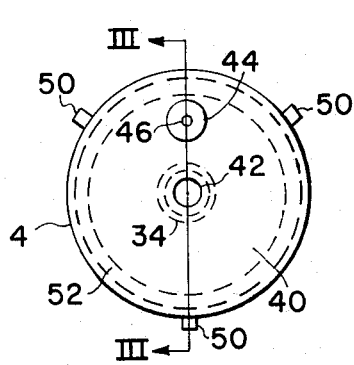
FIG. 2 is an end view of the catalyst cartridge of this invention.
Figure 4:
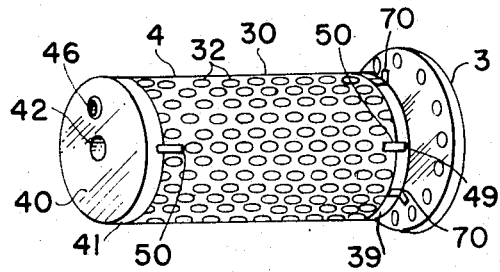
FIG. 4 is a perspective view of the assembled catalyst cartridge of this invention mounted on the end of the reactor case of the system of FIG. 1.

The catalytic cartridge 4 of this invention is shown in greater detail in FIGS. 2, 3, and 4. The mixture of hydrogen and carbon dioxide gas enters the interior of the cartridge 4 from the supply line 14 at the end 15. The gas entering has been heated to a reaction temperature of approximately 1,000° to 1,400°F by the electric heater shown schematically at 16 near the end 15 of the line 14.

The cartridge 4 includes an outer cylindrical metal wall 30 having perforations 32 therein, and an inner cylindrical metal wall 34 having perforations 36 therein. The inner and outer cylindrical walls are retained between a base plate 38 and a cover 40. The base plate 38 has a circular flange 39 extending over one end of outer metal wall 30 and the cover 40 has a similar flange 41 extending over the other end of the wall 30. The cover 40 has a central aperture 42 through which the supply line 14 passes. A smaller aperture 44 in the cover 40 is provided for a cartridge thermcouple well 46 which extends into the space defined between the inner and outer cylindrical walls and the base and cover plates.

Apertures 49 and 51 in the flanges 39 and 41 of the base plate 38 and cover 40 respectively are provided for retaining one end of clips 50. The other end of the clips 50 is inserted into a perforation 32 in the outer wall 30 thus securing the base 38 and cover plate 40 to the outer wall 30.

As shown most clearly in FIG. 3, the inner surfaces of the outer perforated wall 30, the outer surface of the inner perforated wall 34, and the inside surface of the base 38 and cover 40, are covered with a layer of ceramic wool bat as shown at 52, 54, 56, and 58, respectively. The preferred embodiment is quartz wool batting. Other suitable known ceramic fiber battings such as high temperature glass may be utilized provided they are non-catalytic in the reaction, and chemically unaffected by prolonged exposure to the reaction environment. The selection of such materials is within the competence of those skilled in the art.

As indicated, the catalyst for the Bosch process is iron. The catalyst is preferably used in a fiber-like form such as steel wool. If too coarse a form of iron is used, there is less surface area and the process accordingly does not run efficiently.

The use of the steel wool as the source of the catalytic iron is desirable since it will readily support the Bosch reaction and remains uniformly distributed within the reaction zone of the catalyst cartridge, as well as providing support to retain the initial carbon deposited prior to build-up of a carbon block structure.

Since during the reaction process, iron diffuses into the resulting carbon product without losing its catalytic activity, this diffusion causes fairly rapid deterioration of a fine steel wool fiber. Should disintegration of the steel wool fiber occur before a sufficient amount of carbon has formed to support the iron and to maintain a fairly uniform distribution throughout the reaction zone, flow channels would develop and adversely effect the rate of the process. A coarser grade of steel wool disintegrates more slowly and thus allowing time for the growth of the supporting carbon block.

In the embodiment shown, no. 2 steel wool 60 is packed firmly into the enclosure defined by the inner and outer walls and the base and cover.

As indicated by the heavy arrows 68 in FIG. 3, the mixture of carbon dioxide, hydrogen gas and any recycled gases flows from the interior of the cartridge inner wall 34 through the perforations 36 thereof, and through the catalyst 60. As the reaction takes place, carbon deposits 66 begin to build up in the mesh of the steel wool catalyst 60. The water vapor resulting from the reduction of carbon dioxide in the reaction, together with unreacted hydrogen, carbon dioxide, carbon monoxide and methane, emerges from the cartridge 4 as shown by the arrows at 68 after passing through the catalyst 60, the outer ceramic batting 52, and the perforations 32 in the outer wall 30.

Most importantly, there is no migration of catalyst-bearing carbon outside of the reaction zone. The reaction takes place entirely within the confines of the reaction zone defined by the quartz wool batting in the cartridge and the migration of carbon and catalyst to other parts of the system is prevented, thus eliminating reaction in other parts of the system and subsequent clogging of the system by carbon deposits.

The metal surfaces of the catalytic cartridge, reactor, and heat exchanger must be non-catalytic under the reaction conditions of the Bosch reaction, that is, the high temperatures and reducing atmosphere. Selection of such materials is within the purview of those skilled in the art.

In the above embodiment, the base 38 and the cover 40 of the cartridge are spun from type 321 stainless steel. The inner and outer walls 34 and 30 are rolled and welded from type 304 stainless steel, perforated with 3/32 inch holes on 5/32 inch centers. All apertures are punched prior to plating. The parts are then plated with an electrolytic nickel strike followed by 1 to 2 mils of electroless nickel. The thermocouple well 46 is alloy 122 phosphorous-dioxidized copper and the cover clips 50 are Inconel X–750. The reactor body 2 and other parts which are exposed to high temperature gases are type 321 stainless steel with electrolytic nickel strike, 1 mil of electroless nickel, 4 mils of nickel electroplate.

The thermocouple well 46 is inserted in the aperture 44 in the cover 40 and locked to the cover 40 with a pressfit copper retaining washer 45. The cover 40 is fastened to the outer wall 30 with the clips 50. The quartz wool liner for the base and inner and outer walls is then inserted. All liners are held temporarily in place by a sheet metal shield while the steel wool catalyst is added. The steel wool should be packed uniformly with special attention given to the region around the thermocouple well 46 in order to eliminate any voids which would lead to channeling of the reaction gases. The shield is then removed and the base 38 with its liner 56 put in place and fastened with the clips 50. The assembled cartridge 4 is then secured to the end 3 of the reactor 2 by means of the brackets 70. Then the cartridge 4 is positioned inside the reactor 2 with the supply line 14 projecting through the aperture 42 of the cover 40 into the area enclosed by the inner wall 34. The thermocouple well 7 attached to the reactor 2 projects into the cartridge thermocouple well 46.

The cartridge in the above embodiment is about 7⅝ inches in diameter and eleven and three-quarters inches in length. The dimensions of the resulting carbon block after allowing for the quartz wool liners are an outside diameter of 7½ inches and an inside diameter of 2¾ inches with a length of about 11½ inches. The cartridge weighed about 2.85 pounds when packed with 150 grams of no. 2 steel wool. Approximately 0.17 pound of quartz wool batting was employed.

A cartridge of this invention of the size utilized in the above embodiment is capable of reducing the carbon dioxide given off by four men for a period of at least three days. With such a cartridge this system can be operated with pressure drops between the inlet of the feed gases into the cartridge and the outlet of the reacted gases of up to 10 p.s.i. The carbon formed in the cartridge as a result of the reduction of the carbon dioxide can build up to a density of about 0.5 grams per cc. before it is necessary to replace the cartridge in order to maintain an efficient reaction rate.

Inspection of a system utilizing the cartridge of this invention after 400 hours of operation shows the system to be free of any carbon deposits outside of the reaction zone.

While the Bosch reaction can be carried out at temperatures of from 1,000 to 1,400°F., it has been found that preferably the reaction should be maintained at 1,150° to 1,300°F, with the most preferred range being 1,240° to 1,270°F. and the ideal temperature 1,250°F. This is conveniently maintained by adjustment of the current flow in the electric heater 16.

The cartridge described in the foregoing embodiment can treat up to 10 pounds of carbon dioxide per day removing at least 3,450 grams of carbon. In a typical day of operation the unit removed 9.28 pounds of carbon dioxide, consumed 0.85 pounds of hydrogen to yield 7.6 pounds of water and 2.53 pounds of carbon. The flow rate of gases was 144 pounds per day. The composition of the recycled gases typically comprised on a volume bass about 40 percent hydrogen, 30 percent methane, 20 percent carbon monoxide, and 10 percent carbon dioxide.

In practice, it has been found that in order to decrease the time to initially establish the Bosch reaction, the iron catalyst should be pre-activated by etching. Typically, the steel wool catalyst is treated with a 3 percent hydrochloric acid solution for 2 to 5 minutes, and then rinsed with distilled water and finally dried in an oven at 230°F for about 30 minutes, prior to packing the cartridge. With this treatment the process usually stabilizes at a normal rate in about 1.5 hours. If the catalyst is not pre-activated, it usually takes about 3 to 8 hours to stabilize the process on initial start up and it may take up to 10 to 12 hours.

While the invention has been explained by a detailed description of a specifc embodiment, it is understood that various modifications and substitutions can be made within the scope of the appended claims which are intended to include equivalents of such embodiment.

What is claimed is:

1. A replaceable cylindrical catalyst cartridge for use in a life support system utilizing the Bosch reaction for the reduction of carbon dioxide comprising:

a housing, said housing including an inner tubular perforated wall, an outer tubular perforated wall spaced outwardly from said inner perforated wall, and a base closing one end of said housing, a cover closing the other end of said housing, said cover being provided with a centrally located aperture having a smaller cross-section than that of said inner perforated wall for admitting a carbon dioxide reaction mixture, a layer of ceramic fiber covering the outer surface of said inner wall, the inner surface of said outer wall, and the inner surfaces of said base and said cover defined between the ends of said inner and outer walls, and a catalyst contained within the space defined by the inner and outer walls, and said base and said cover, said catalyst having the inherent physical property characteristic of catalyzing the reduction of carbon dioxide to carbon and water in the presence of hydrogen and in the temperature range of 1,000°–1,400°F.

2. A catalyst cartridge as claimed in claim 1 wherein said catalyst is an iron catalyst in the form of activated steel wool.

3. A replaceable catalyst cartridge comprising an inner cylindrical perforated wall, an outer cylindrical perforated wall spaced radially from said inner perforated wall, a circular base closing one end of said cartridge, a circular cover closing the other end of said cartridge, said cover having a centrally located aperture therein through which a gaseous reaction mixture comprising carbon dioxide and hydrogen may be admitted, said inner wall, outer wall, base, and cover each being comprised of metal and having the inherent physical property characteristic of being non-reactive in a reducing atmosphere at temperatures up to 1,400°F, a layer of ceramic fiber covering the outer surface of said inner wall, the inner surface of said outer wall, and the inner surfaces of said base and said cover defined between the ends of said inner and outer walls, and an iron catalyst contained within the space defined by said inner and outer walls and said base and said cover.

4. A cartridge as claimed in claim 3 wherein said iron catalyst is in the form of steel wool.

5. A cartridge as claimed in claim 4 wherein said ceramic fiber is in the form of quartz wool batting.

6. A cartridge as claimed in claim 5 wherein said steel wool has been activated by etching with dilute hydrochloric acid.

* * * * *